F. SCHMITT.
Velocipede.
No. 91,169.  Patented June 8, 1869.
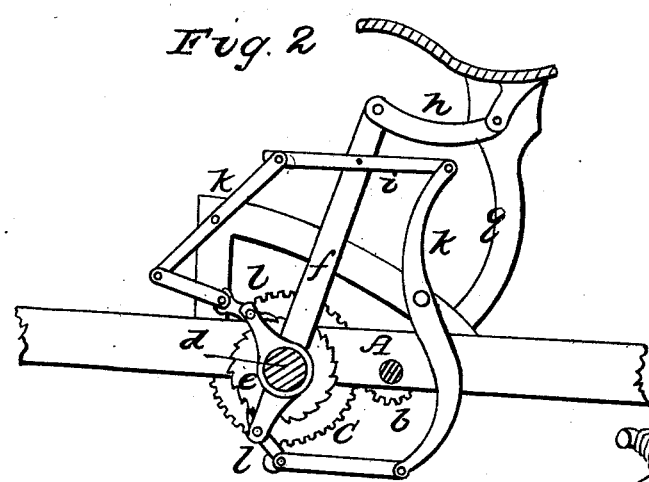
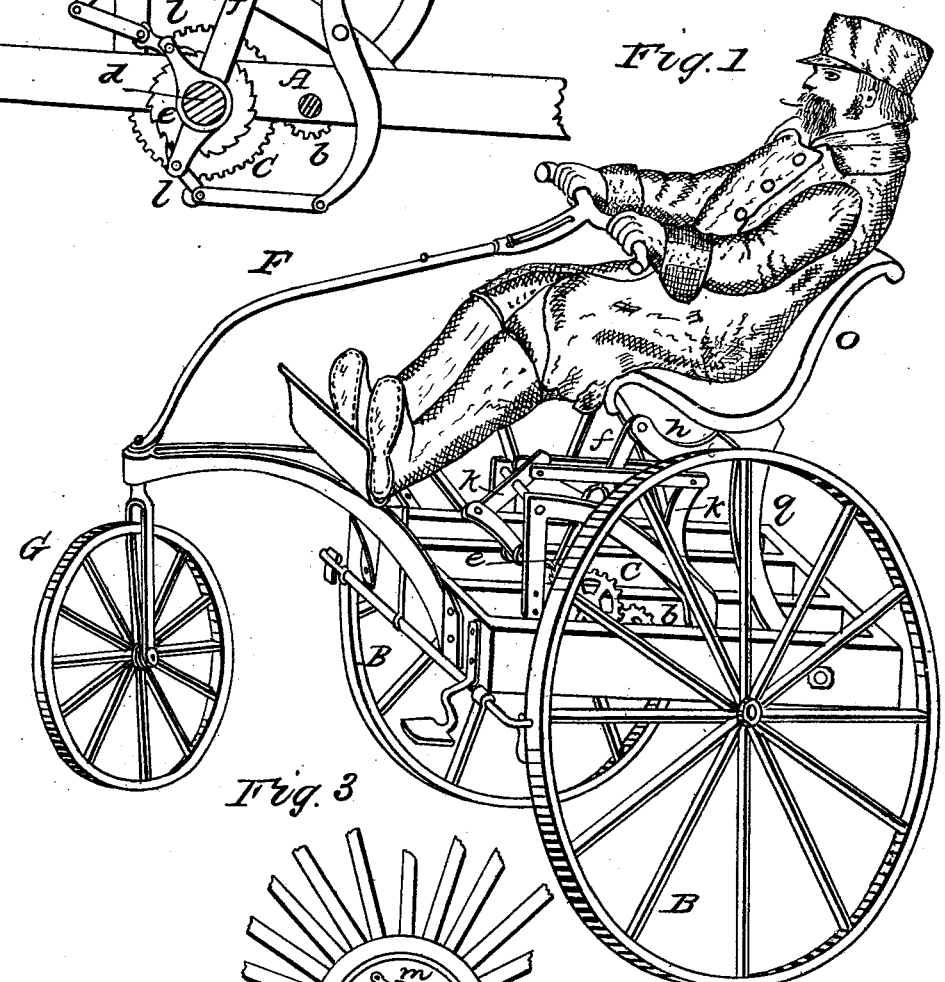
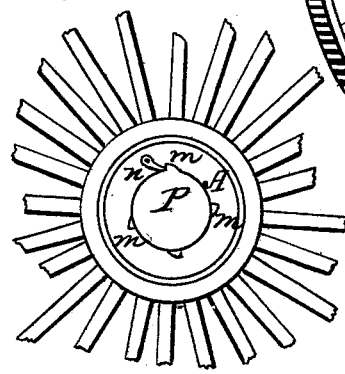
Witnesses—
Inventor
F. Schmitt

United States Patent Office.

FRIEDRICH SCHMITT, OF SPRINGFIELD, ILLINOIS.

Letters Patent No. 91,169, dated June 8, 1869.

IMPROVEMENT IN VELOCIPEDES

The Schedule referred to in these Letters Patent and making part of the same.

Be it known that I, FRIEDRICH SCHMITT, of Springfield, Sangamon county, Illinois, have invented a new and improved Velocipede; and I do hereby declare that the following is a full and accurate description of the construction and operation of the same, reference being had to the accompanying drawings, and to the letters of reference marked thereon.

The nature of my invention consists in constructing a velocipede with three wheels, one in front, for a guide, the other two in rear, connected together by a revolving axle.

The motive-power is communicated to the velocipede by means of machinery over the revolving axle and under the seat, which machinery is put in operation by the weight of and backward or forward motion of the occupant of the seat, or rider.

Also, such a construction and arrangement of the rear wheels, in relation to the axle, as to enable either one of these to revolve faster than the axle, when necessary, and then have its rate of speed reduced so as to conform to the revolution of the axle.

Figure 1 represents a side view of the whole velocipede.

Figure 2 represents a side sectional view of the machinery under the rider's seat and over the revolving axle.

Figure 3 represents a section of nave of one of the rear wheels, showing the peculiar construction necessary to permit a faster revolution than the axle, by the wheel when necessary, and to check it and make it conform to and revolve with the axle also when necessary.

A is the revolving axle, connecting the two rear wheels B B.

In the centre of this revolving axle is the pinion b, operated upon by the cogged driving-wheel c, which is directly in front of the pinion b, and forms a part of the machinery which makes the axle A revolve.

This cogged driving-wheel c revolves on one end of its own axle d, supported in two cross-pieces, which form part of the box of the vehicle, in front of the wheel axle A.

In the centre of the drive-wheel axle d, and surrounding it, is the ratchet-wheel e.

Attached to the end of the axle d, opposite the driving-wheel c, is the upright vibrating lever f, which is joined from the upper end to the seat-support g, by the connecting-bar h.

Just below where this connecting-bar h is attached to the upright lever f, the cross-piece i is attached, connecting together at the tops the two jointed levers k k, which are so jointed as to allow the snappers l l on the ends of each, to rest upon opposite sides of the ratchet-wheel e, and work upon the same at different times.

The seat-support g has a backward and forward movement upon a pivot, by which it is fastened to the box of the vehicle.

G is a guide-wheel in front of the vehicle, which is controlled by the driver from his seat, by means of the handle F.

The operation of this machinery is as follows:

The weight of the rider upon the seat o, and a slight movement backward or forward causes the seat-support g to move backward or forward, which motion is communicated to the upright lever f by the connecting-bar h, which in turn starts the revolution of the driving-wheel axle d.

This movement of the lever f also gives a corresponding movement to the jointed levers, k k, and in such a way that one lever, k, is moving backward while the other is moving forward, and so one of the snappers, l, is always caught in the ratchet-wheel e, and assisting in the revolution of the driving-wheel axle d, and in this way the impelling force of the machine never ceases for an instant.

This revolution of the ratchet-wheel e forces the revolution of the driving-wheel c, which, by its connection with the pinion b, forces the revolution of the axle A and wheels B.

The axle A revolves, and with it the rear wheels B B; but these wheels are fitted loosely to the axle, like the wheels of a common carriage, but there is a band, p, around the end of the axle A, close to the but of the hub, and on this band are two or three projections, m m.

On the but of the hub is the catch n, made to fit into these projections m m.

When the axle A commences to revolve, the projection m, on the collar or band p, comes up to the catch n, and thus pushes the wheel around with the axle A.

When a turn is made, or a circle described by the velocipede, the outer wheel must revolve faster than the inner wheel.

The speed of the inner wheel is checked or made to keep on with the revolution of the axle, and by this arrangement the outer wheel can revolve faster than the axle until the circle is described, when the revolution of the axle overtakes the revolution of the outer wheel, and makes it conform to it.

Now, what I claim as my invention, and desire to secure by Letters Patent, is—

The within-described velocipede, constructed and arranged substantially as set forth, with the revolving axle A, rear wheels B B, guide-wheel G, and guide F, and operated by means of the pinion b, driving-wheel c, axle d, ratchet-wheel e, upright vibrating lever f, connecting-bar h, seat-support and seat q, cross-piece i, jointed levers k k, and snappers, l l, substantially as and for the purpose shown.

Also, in combination with the above, the collar-band p, and catch n, substantially as and for the purpose shown and described.

FRIEDRICH SCHMITT.

Witnesses:
GEO. O. MARCY,
BENJN. S. PARDEE.